(12) United States Patent
Matsushima (10) Patent No.: US 12,117,677 B2
(45) Date of Patent: Oct. 15, 2024

(54) DISPLAY DEVICE WITH POLARIZATION AXIS ROTATION ELEMENT AND POLARIZER

(71) Applicant: Japan Display Inc., Tokyo (JP)

(72) Inventor: Toshiharu Matsushima, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 18/087,845

(22) Filed: Dec. 23, 2022

(65) Prior Publication Data

US 2023/0130531 A1 Apr. 27, 2023

Related U.S. Application Data

(63) Continuation of application No. PCT/JP2021/013686, filed on Mar. 30, 2021.

(30) Foreign Application Priority Data

Jun. 26, 2020 (JP) .................................. 2020-110538

(51) Int. Cl.
*G02F 1/01* (2006.01)
*G02B 27/01* (2006.01)
(Continued)

(52) U.S. Cl.
CPC ....... *G02F 1/0136* (2013.01); *G02B 27/0101* (2013.01); *G02F 1/133531* (2021.01);
(Continued)

(58) Field of Classification Search
CPC .......................... G02F 1/1347; G02F 1/133753
See application file for complete search history.

(56) References Cited

U.S. PATENT DOCUMENTS 5,539,074 A    7/1996 Herr et al.
5,602,661 A *  2/1997 Schadt .............. G02F 1/133711
                                              349/182
(Continued)

FOREIGN PATENT DOCUMENTS

GB    2-306231    * 4/1990  ............... G02B 5/30
JP    6-289374 A    10/1994
(Continued)

OTHER PUBLICATIONS

International Search Report and Written Opinion mailed on Jun. 22, 2021, received for PCT Application PCT/JP2021/013686, filed on Mar. 30, 2021, 14 pages including English Translation.
(Continued)

*Primary Examiner* — Lauren Nguyen
(74) *Attorney, Agent, or Firm* — XSENSUS LLP (57) ABSTRACT

According to one embodiment, a display device including a display panel which displays images, a polarization axis rotation element located between the display panel and an observer, and a polarizer located between the display panel and the polarization axis rotation element, wherein the polarization axis rotation element includes a first area and a second area different from the first area, and an orientation of a first polarization axis of a first polarization component transmitted through the first area is different from an orientation of a second polarization axis of a second polarization component transmitted through the second area.

8 Claims, 8 Drawing Sheets

(51) Int. Cl.
*G02F 1/1335* (2006.01)
*G02F 1/13363* (2006.01)
*G02F 1/1337* (2006.01)

(52) U.S. Cl.
CPC .. *G02F 1/133638* (2021.01); *G02F 1/133738* (2021.01); *G02F 1/133753* (2013.01); *G02F 1/133757* (2021.01); *G02F 1/133773* (2021.01); *G02F 2413/01* (2013.01); *G02F 2413/08* (2013.01)

(56) References Cited

U.S. PATENT DOCUMENTS

| | | | |
|---|---|---|---|
| 5,861,931 | A | 1/1999 | Gillian et al. |
| 2002/0027624 | A1 | 3/2002 | Seiberle |
| 2018/0124364 | A1 | 5/2018 | Yata et al. |

FOREIGN PATENT DOCUMENTS

| | | |
|---|---|---|
| JP | 9-33914 A | 2/1997 |
| JP | 9-138308 A | 5/1997 |
| JP | 2007-192989 A | 8/2007 |
| JP | 2018-30522 A | 3/2018 |
| JP | 2018-72598 A | 5/2018 |
| WO | 2020/017544 A1 | 1/2020 |

OTHER PUBLICATIONS

English-language translation of Japanese Office Action issued Feb. 6, 2024, in corresponding Japanese Patent Application No. 2020-110538.

* cited by examiner

DISPLAY DEVICE WITH POLARIZATION AXIS ROTATION ELEMENT AND POLARIZER

CROSS-REFERENCE TO RELATED APPLICATIONS

This application is a Continuation Application of PCT Application No. PCT/JP2021/013686, filed Mar. 30, 2021 and based upon and claiming the benefit of priority from Japanese Patent Application No. 2020-110538, filed Jun. 26, 2020, the entire contents of all of which are incorporated herein by reference.

FIELD

Embodiments described herein relate generally to a display device and a polarization axis rotation element.

BACKGROUND

Head-up display (HUD) devices are configured to be installed in a dashboard or the like of a vehicle and display light emitted from the display panel is projected onto the windshield to display a predetermined display image as an imaginary image in front of the windshield. With this configuration, the driver, who is the observer, can visually recognize information such as vehicle speed and distance traveled without having to substantially move the light of sight while driving.

For example, there may be cases where the driver wear polarized sunglasses to reduce glare from road signs, reflections of objects placed on the dashboard onto the windshield and the like. If the displayed light contains both P-wave components and S-wave components, the polarized sunglasses cut the S-wave components of the displayed light, so the luminance of the displayed light visually recognized by the driver is reduced due to the loss of the S-wave components. Under these circumstances, the driver may have difficulties in viewing the display image projected by the HUD device.

DETAILED DESCRIPTION

In general, according to one embodiment, a display device includes a display panel which displays images, a polarization axis rotation element located between the display panel and an observer and a polarizer located between the display panel and the polarization axis rotation element, and the polarization axis rotation element includes a first area and a second area different from the first area, and an orientation of a first polarization axis of a first polarization component transmitted through the first area being different from an orientation of a second polarization axis of a second polarization component transmitted through the second area.

According to another embodiment, a polarization axis rotation element includes a first area and a second area different from the first area, and an orientation of a first polarization axis of a first polarization component transmitted through the first area being different from an orientation of a second polarization axis of a second polarization component transmitted through the second area.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same elements as those described in connection with preceding drawings are denoted by like reference numerals, and a detailed description thereof is omitted unless otherwise necessary.

Figure 1:
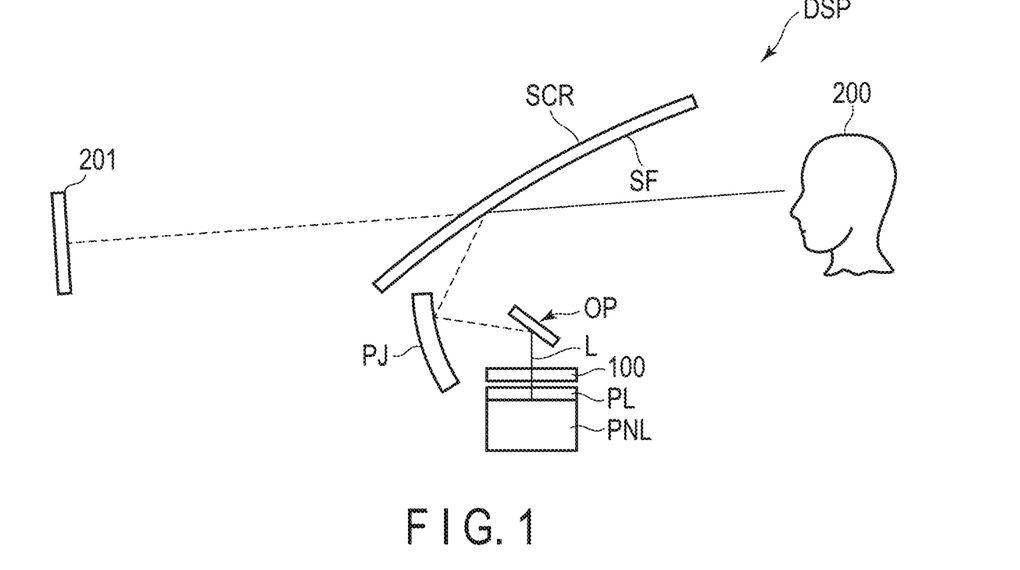
FIG. 1 is a diagram showing a configuration example of a display device according to an embodiment.

FIG. 1 is a diagram showing a configuration example of a display device DSP of this embodiment.

The display device DSP shown in this figure is a head-up display which utilizes a windshield of a vehicle or the like as a screen SCR for projection. Note that the screen SCR is not limited to the windshield itself, but some other combiner may be used. In the following descriptions, the parts of the display device DSP will be described on the assumption that an upper direction as seen from an observer 200 who views display images displayed by the display device DSP is referred to as "above", a lower direction is referred to as "below", a forward direction is referred to as "front".

The display device DSP comprises a display panel PNL which displays images, a polarizer PL, a polarization axis rotation element 100, an optical system OP and a projection portion PJ.

The display panel PNL emits display light representing a display image for reporting, for example, display information such as vehicle speed and distance traveled. The display panel PNL can be applied to, for example, a liquid crystal display panel, an organic electroluminescent display panel, a display panel which employs a micro-LED and the like.

The polarizing plate PL is provided above the display panel PNL and is attached to an upper surface of the display panel PNL. The polarizer PL is located between the display panel PNL and the polarization axis rotation element 100. The polarizer PL transmits, as display light, only the light in the oscillation direction along the transmission axis of the polarizer PL out of the light emitted from the display panel PNL. For example, when the display panel PNL is a liquid crystal display panel, a polarizer is located also below the display panel PNL, and the transmission axes of the upper polarizer PL and the lower polarizer are set to directions orthogonal to each other.

The polarization axis rotation element 100 rotates the polarization axis of linearly polarized light. The polarization axis rotation element 100 may be a single optical film or a multilayer optical film. Further, it suffices if the polarization axis rotation element 100 is of any type which can exhibit the function of rotating the polarization axis, and it is not limited to an optical film. It may as well be an element with optical rotation ability, such as a twisted nematic liquid crystal element. The polarization axis rotation element 100 is located on the path of the display light L between the display panel PNL (polarizer PL) which emits linearly polarized light and the observer 200. The polarization axis rotation element 100 may be located anywhere between the display panel PNL and the observer 200, or may be attached in the optical system OP or on the screen SCR.

The optical system OP comprises one or more mirrors which guides the light emitted from the display panel PNL (display light) to the projection portion PJ. The projection part PJ projects the light guided by the optical system OP on the screen SCR. To the projection section PJ, for example, a concave mirror is applicable.

The screen SCR reflects the display light L incident on a curved surface SF towards the observer 200. Thus, the curved surface SF is a reflective surface which reflects the display light L emitted from the display panel PNL toward the observer 200. Further, the screen SCR transmits light from the front. In this manner, the observer 200 can view an imaginary image 201 in front of the screen SCR. Therefore, the display device DSP enables the observer 200 to view both the displayed image and the external view that actually exists in front.

Embodiment 1

Figure 2:
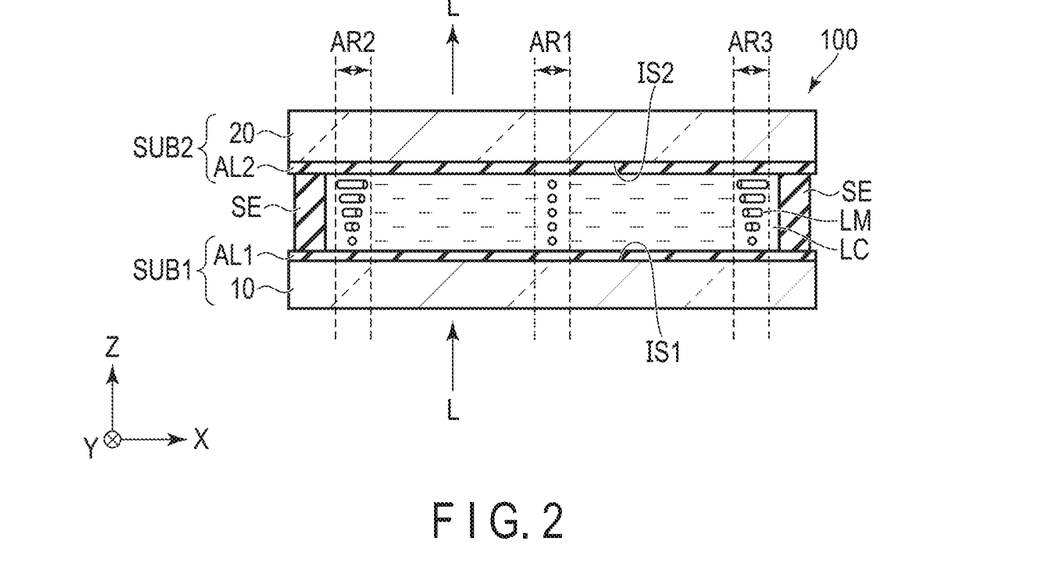
FIG. 2 is a cross-sectional view showing a configuration example of a polarization axis rotation element shown in FIG. 1.

FIG. 2 is a cross-sectional view of one configuration example of the polarization axis rotation element 100 shown in FIG. 1.

A first direction X, a second direction Y and a third direction Z shown here are orthogonal to each other, but they may intersect each other at an angle other than 90°. The first direction X and the second direction Y correspond, for example, to directions parallel to the substrate contained in the polarization axis rotation element 100, and the third direction Z is equivalent to the thickness direction of the polarization axis rotation element 100.

The polarization axis rotation element 100 comprises a first substrate SUB1, a second substrate SUB2 opposing the first substrate SUB1 and a liquid crystal layer LC located between the first substrate SUB1 and the second substrate SUB2. The first substrate SUB1 and the second substrate SUB2 are adhered to each other by a sealant SE. The display light L progresses from the first substrate SUB1 side to the second substrate SUB2 side.

The first substrate SUB1 comprises a first insulating base 10 and a first alignment film AL1 disposed on an inner surface IS1 of the insulating base 10. The second substrate SUB2 has a second insulating base 20 and a second alignment film AL2 disposed on an inner surface IS2 of the second insulating base 20. The first insulating base 10 and the second insulating base 20 are formed of, for example, transparent glass or resin. The first alignment film AL1 and the second alignment film AL2 have horizontal alignment property. That is, the first alignment film AL1 and the second alignment film AL2 are horizontal alignment films having an alignment restriction force parallel to an X-Y plane. The liquid crystal layer LC is sealed between the first substrate SUB1 and the second substrate SUB2 by the sealant SE. The first alignment film AL1 and the second alignment film AL2 are in contact with the liquid crystal layer LC.

The polarization axis rotation element 100 includes a first area AR1 and a second area AR2, which is different from the first area AR1, and a third area AR2, which is different from the first area AR1 or the second area AR2. The third area AR3 is located on an opposite side to the second area AR2 with respect to the first area AR1. The liquid crystal layer LC contains liquid crystal molecules LM. The liquid crystal molecules LM are not twist-aligned in the first area AR1 but are twist-aligned in the second area AR2 and the third area AR3. The liquid crystal layer LC has the ability to rotate the polarization axis of the polarization component, which is linearly polarized light.

Figure 3:
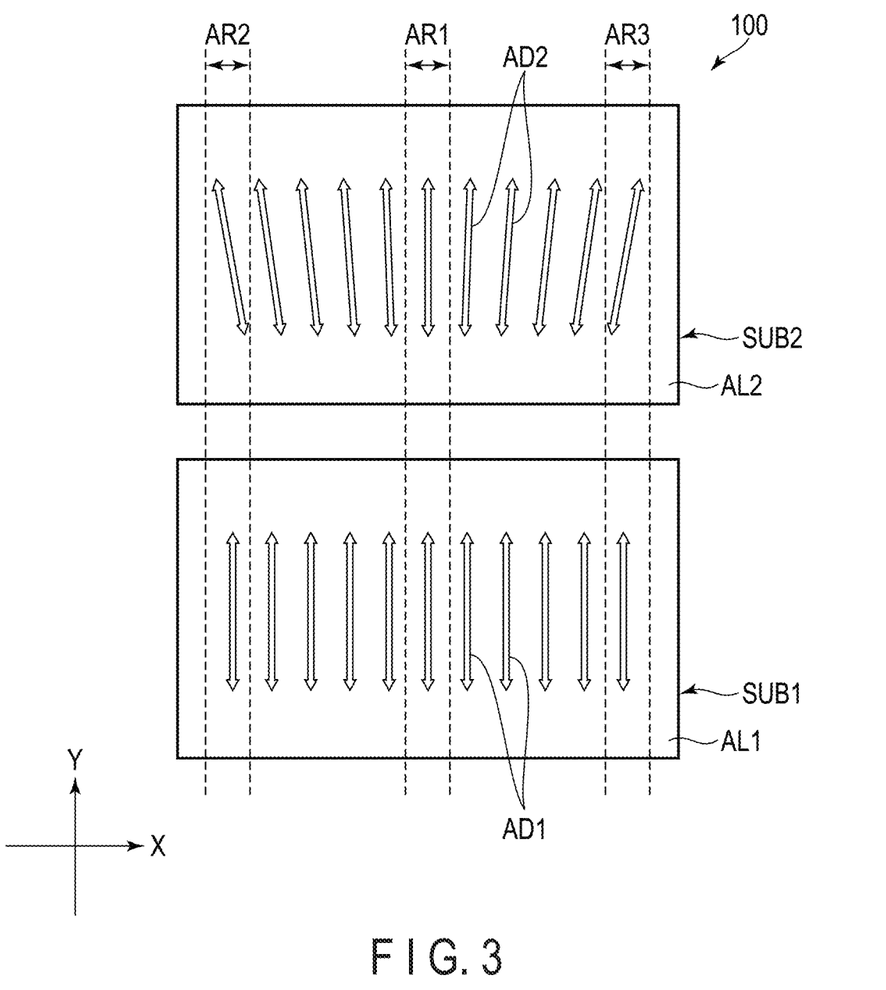
FIG. 3 is a diagram showing an alignment treatment direction of a first alignment film and an alignment treatment direction of a second alignment film of the polarization axis rotation element shown in FIG. 2.

FIG. 3 is a diagram showing an alignment treatment direction AD1 of the first alignment film AL1 and an alignment treatment direction AD2 of the second alignment film AL2 of the polarization axis rotation element 100 shown in FIG. 2. FIG. 3 illustrates the first substrate SUB1 and the second substrate SUB2 side by side to each other for the sake of explanation.

The alignment treatment direction AD1 of the first alignment film AL1 is parallel to the second direction Y. The alignment treatment direction AD2 of the second alignment film AL2 varies from one location to another. For example, in the example illustrated, the alignment treatment direction AD2 is inclined further gradually counter-clockwise as the location located farther apart to the left from the first area AR1 and is inclined further gradually clockwise as the location located farther apart to the right from the first area AR1.

The alignment treatment applied to the first alignment film AL1 and second alignment film AL2 may be rubbing or optical alignment treatment. When the optical alignment treatment is used, the first alignment film AL1 and second alignment film AL2 are exposed via a mask with slits. In order to form the second alignment film AL2 having the alignment treatment direction AD2 in various orientations as shown in the figure, the second alignment film AL2 is exposed while being rotated multiple times to the respective slit. Note that the first alignment film AL1 and the second alignment film AL2 may be aligned by mask rubbing.

Figure 4:
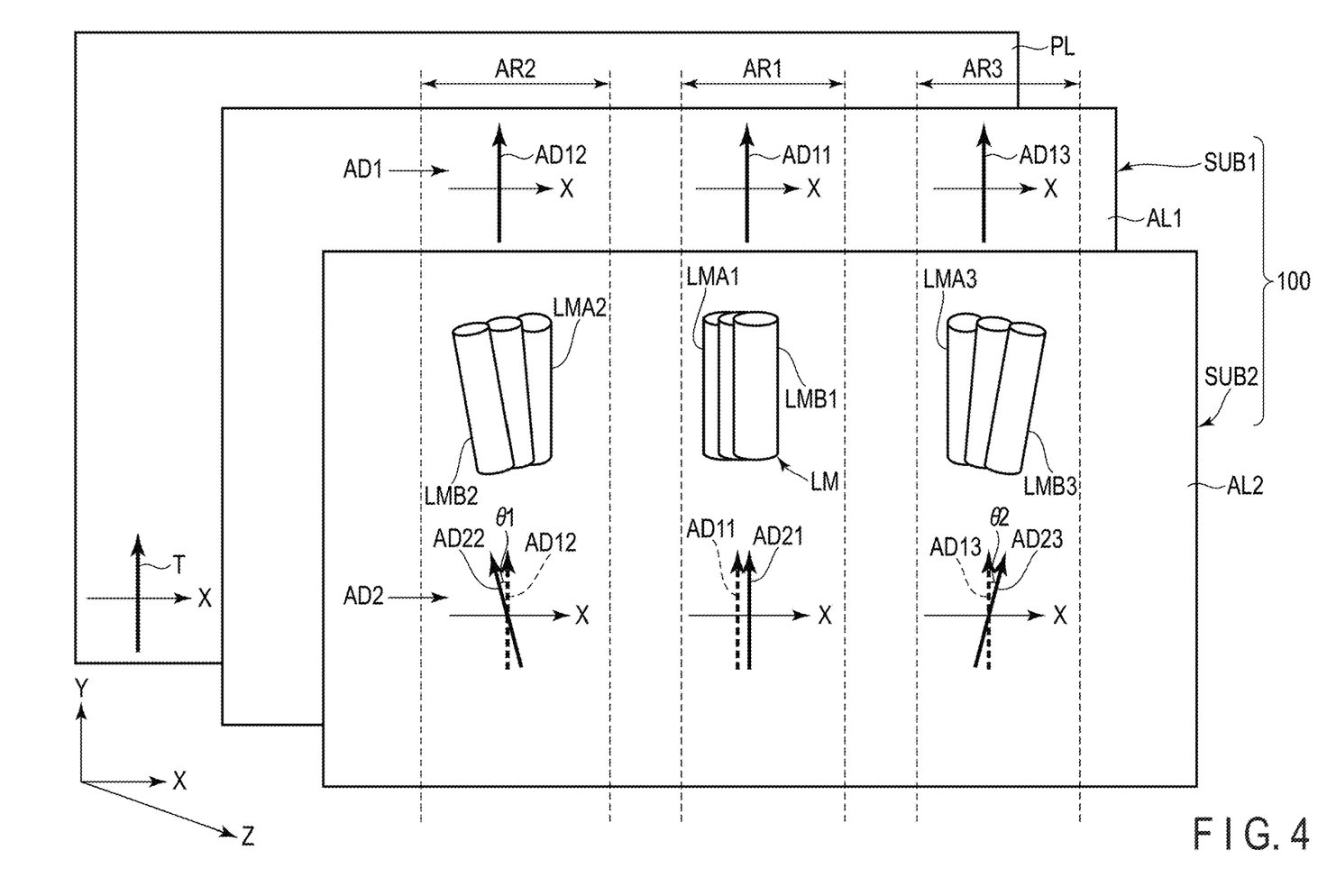
FIG. 4 is a diagram illustrating a relationship between a polarizer and a polarization axis rotation element.

FIG. 4 is a diagram illustrating the relationship between the polarizer PL and the polarization axis rotation element 100. Here, in the X-Y plane, the orientation of the tip of the arrow indicating the first direction X (X-axis) is set to a reference orientation, and the angle counterclockwise with respect to the reference orientation is the positive angle.

The polarizer PL has a transmission axis T. Note that the absorption axis of the polarizer PL is substantially orthogonal to the transmission axis T, though the illustration thereof is omitted. The transmission axis T is located at an orientation of 90° with respect to the x-axis. Note here that the orientation of 90° is equivalent to an orientation spanning 90° to 270°.

In the first alignment film AL1, an alignment treatment direction AD11 of the first area AR1, an alignment treatment direction AD12 of the second area AR2, and an alignment treatment direction AD13 of the third area AR3 are parallel to each other. The alignment treatment directions AD11, AD12 and AD13 are substantially parallel to the transmission axis T. That is, the alignment treatment directions AD11, AD12 and AD13 are located at an orientation of 90° with respect to the x-axis. Note that the alignment treatment directions AD11, AD12 and AD13 may be orthogonal to the transmission axis T.

In the second alignment film AL2, an alignment treatment direction AD21 of the first area AR1, an alignment treatment direction AD22 of the second area AR2, and an alignment treatment direction AD23 of the third area AR3 are different from each other. The alignment treatment direction AD21 is substantially parallel to the transmission axis T. That is, the alignment treatment direction AD21 is located at an orientation of 90° with respect to the X axis. In the second alignment film AL2, an alignment treatment direction AD22 of the second area AR2 is inclined at a first angle θ1 counter-clockwise with respect to the alignment treatment direction AD21 of the first area AR1. That is, the alignment treatment direction AD22 is located at an orientation of 90°+θ1 with respect to the X-axis. In the second alignment film AL2, the alignment treatment direction AD23 of the third area AR3 is inclined at a second angle θ2 clockwise with respect to the alignment treatment direction AD21 of the first area AR1. In other words, the alignment treatment direction AD23 is located at an orientation of 90°−θ2 with respect to the X-axis.

Further, when the first alignment film AL1 and the second alignment film AL2 are compared, the alignment treatment direction AD11 of the first alignment film AL1 and the alignment treatment direction AD21 of the second alignment film AL2 are approximately parallel to each other in the first area AR1. In the second area AR2, the alignment treatment direction AD12 of the first alignment film AL1 and the alignment treatment direction AD22 of the second alignment film AL2 are different from each other. The alignment treatment direction AD22 is inclined at the first angle θ1 counterclockwise with respect to the alignment treatment direction AD12. In the third area AR3, the alignment treatment direction AD13 of the first alignment film AL1 and the alignment treatment direction AD23 of the second alignment film AL2 are different from each other. The alignment treatment direction AD23 is inclined at a second angle θ2 clockwise with respect to the alignment treatment direction AD13. For example, the magnitude of the first angle θ1 and the magnitude of the second angle θ2 are equal to each other.

In the first area AR1, liquid crystal molecules LMA on side close to the first substrate SUB1 are aligned such that their longitudinal axes are along the alignment treatment direction AD11. Or, these liquid crystal molecules LMA1 are aligned in an orientation along the transmission axis T. In other words, these liquid crystal molecules LMA1 are aligned at an orientation of 90° with respect to the X axis. Liquid crystal molecules LMB1 on side close to the second substrate SUB2 are aligned such that their longitudinal axes are along the alignment treatment direction AD21. Or, these liquid crystal molecules LMB1 are aligned in an orientation along the transmission axis T. In other words, these liquid crystal molecules LMB1 are aligned at an orientation of 90° with respect to the X axis.

In the second area AR2, liquid crystal molecules LMA2 on a side close to the first substrate SUB1 are aligned such that their longitudinal axes are along the alignment treatment direction AD12. Or, these liquid crystal molecules LMA2 are aligned in an orientation along the transmission axis T. In other words, these liquid crystal molecules LMA2 are aligned at an orientation of 90° with respect to the X axis. Liquid crystal molecules LMB2 on a side close to the second substrate SUB2 2 are aligned such that their longitudinal axes are along the alignment treatment direction AD22. In other words, these liquid crystal molecules LMB2 are aligned at an orientation of 90°+θ1 with respect to the X-axis. In the second area AR2, the liquid crystal molecules LM aligned along the third direction Z are counterclockwise twist-aligned.

In the third area AR3, liquid crystal molecules LMA3 on a side close to the first substrate SUB1 are aligned such that their longitudinal axes are along the alignment treatment direction AD13. Or, these liquid crystal molecules LMA3 are aligned in an orientation along the transmission axis T. In other words, the liquid crystal molecules LMA3 are aligned at an orientation of 90° with respect to the X axis. Liquid crystal molecules LMB3 on a side close to the second substrate SUB2 are aligned such that their longitudinal axes are along the alignment treatment direction AD23. In other words, these liquid crystal molecules LMB3 are aligned in an orientation of 90°−θ2 with respect to the X axis. In the third area AR3, these liquid crystal molecules LM arranged along the third direction Z are clockwise twist-aligned. In other words, the liquid crystal molecules LM in the third area AR3 are twist-aligned in a direction different from that of the liquid crystal molecules LM in the second area AR2.

The alignment treatment direction AD2 of the second alignment film AL2 is at −10 to 10° with respect to the transmission axis T of the polarizer PL. Since the alignment treatment direction AD1 of the first alignment film AL1 is parallel to the transmission axis T, it can be the that the alignment treatment direction AD2 is at −10 to 10° with respect to the alignment treatment direction AD1. Let us suppose here, for example, in the second alignment film AL2, the alignment treatment direction AD22 is an alignment treatment direction most inclined counterclockwise with respect to the transmission axis T. In other words, assume that 90°+θ1 is the maximum inclination angle. In that case, the first angle θ1 is 10° or less. On the other hand, let us suppose, for example, in the second alignment film AL2, the alignment treatment direction AD23 is an alignment treatment direction most inclined clockwise with respect to the transmission axis T. In other words, assume that 90°−θ2 is the minimum inclination angle. In this case, the second angle θ2 is 10° or less. That is, the difference between the maximum inclination angle, 90°+θ1 and the minimum inclination angle, 90°−θ2, which is, θ1+θ2, is 20° or less.

Figure 5:
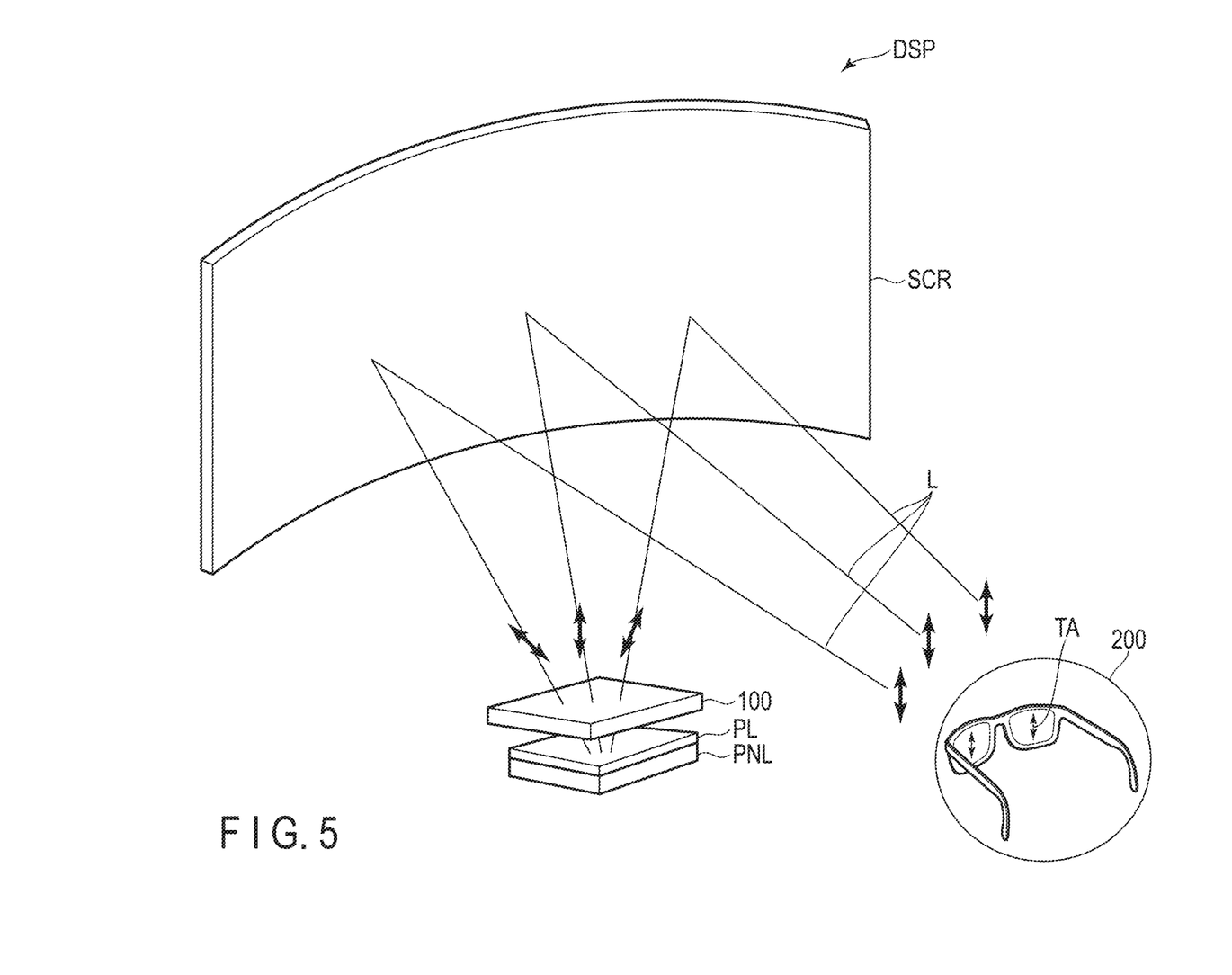
FIG. 5 is a diagram showing a configuration example of a display device which employs the polarization axis rotation element.

FIG. 5 is a diagram showing a configuration example of the display device DSP which employs the polarization axis rotation element 100.

The display light L emitted from the display panel PNL is reflected by the screen SCR and reaches the observer 200. For example, if the screen SCR is curved, the polarization axis of the linearly polarized light may be rotated when the display light L is reflected by the screen SCR. There may be other cases where the polarization axis of the linearly polarized light is rotated before the display light L emitted from the display panel PNL reaches the observer 200. During such situations, when the observer 200 observes the displayed image while wearing polarizing sunglasses, the luminance as viewed may be decreased or brightness may be varied depending on the display position. Here, the polarization component parallel to the absorption axis of the polarizing sunglasses is defined as the S-wave component, and the polarization component parallel to the transmission axis TA of the polarizing sunglasses is defined as the P-wave component.

In this embodiment, the polarization axis rotation element 100 that rotates linear polarization is located between the display panel PNL and the observer 200. Therefore, the polarization axis of the polarization component transmitted through the polarizer PL is rotated in a desired direction by the polarization axis rotation element 100. In other words, in consideration of the state that the linearly polarized light transmitted through the polarizer PL is rotated by reflection on the screen SCR, and the like, the linearly polarized light is rotated in advance by the polarization axis rotation element 100, thus making it possible to convert the display light L back to the linearly polarized light of the P-wave component before reaching the eyes of the observer 200. With this configuration, even if the observer 200 is wearing polarizing sunglasses which cut off the S-wave component of light, light of the P-wave component, which is parallel to the transmission axis TA of the polarizing sunglasses can reach the eyes of the observer 200. Therefore, the decrease in luminance of the light reaching the observer 200 can be suppressed and the displayed image can be visually recognized excellently. Further, even if the observer 200 is wearing polarized sunglasses, the brightness can be visually recognized uniformly regardless of the display position of the screen SCR.

Figure 6:
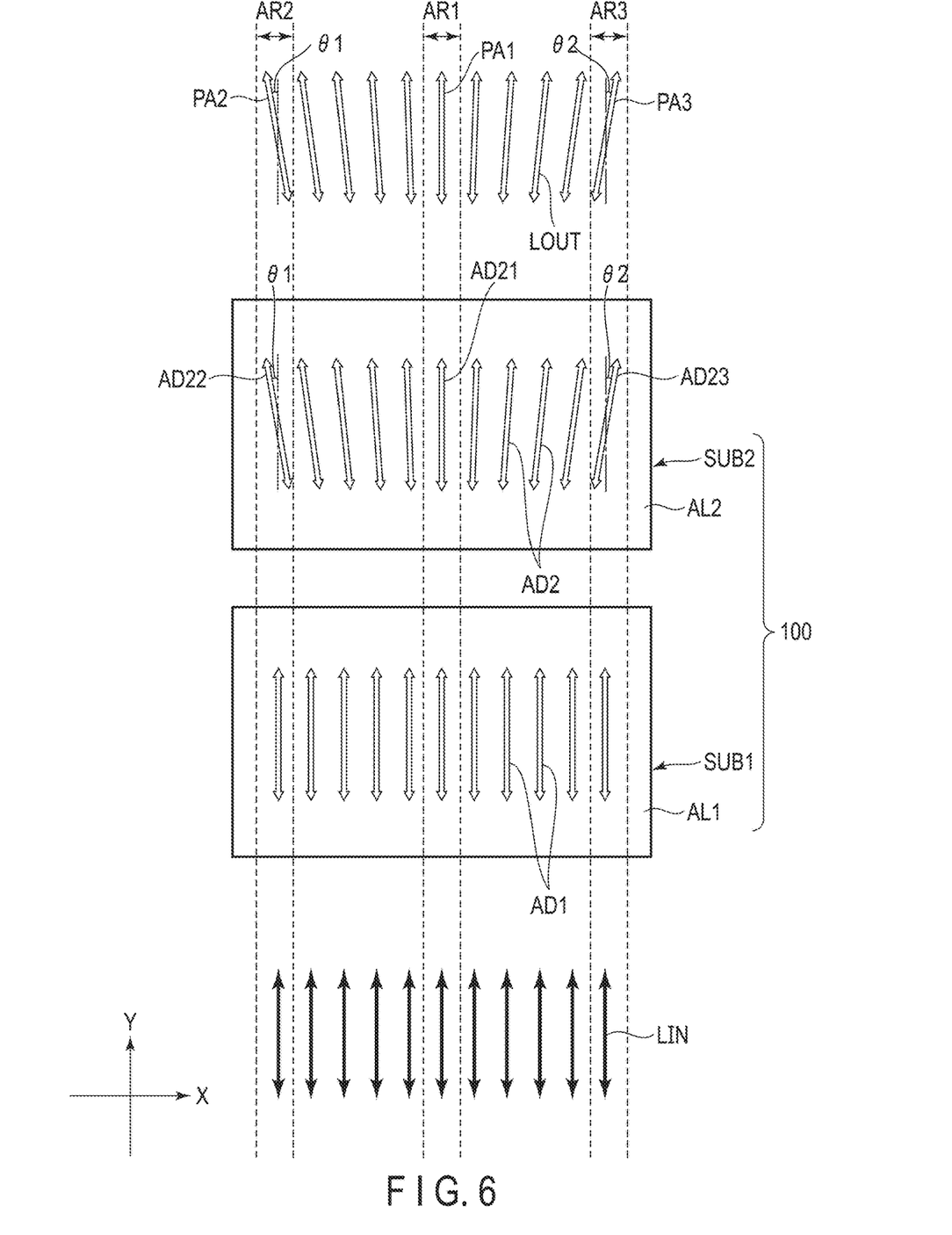
FIG. 6 is a diagram showing a polarization axis of linearly polarized light incident on the polarization axis rotation element and a polarization axis of linearly polarized light transmitted through the polarization axis rotation element.

FIG. 6 is a diagram illustrating the polarization axis of linearly polarized light LIN incident on the polarization axis rotation element 100 and the polarization axis of linearly polarized light LOUT transmitted through the polarization axis rotation element 100.

The polarization axis of the linearly polarized light LIN incident on the polarization axis rotation element 100 is parallel to the second direction Y. The alignment treatment direction AD1 of the first alignment film AL1 is parallel to the polarization axis of the linearly polarized light LIN.

The polarization axis of the linearly polarized light LOUT transmitted through the polarization axis rotation element 100 is parallel to the alignment treatment direction AD2 of the second alignment film AL2. The first polarization axis PA1 of the first polarization component transmitted through the first area AR1, the second polarization axis PA2 of the second polarization component transmitted through the second area AR2, the third polarization axis PA3 of the third polarization component transmitted through the third area AR3 are different from each other in orientation. The first polarization axis PA1 is parallel to the alignment treatment direction AD21. The first polarization axis PA1 is located at an orientation of 90° with respect to the X axis. The second polarization axis PA2 is parallel to the alignment treatment direction AD22. The second polarization axis PA2 is located at an orientation of 90°+θ1 with respect to the X-axis. The third polarization axis PA3 is parallel to the alignment treatment direction AD23. The third polarization axis PA3 is located at an orientation of 90°−θ2 with respect to the X-axis. Thus, according to the first embodiment, the orientations of the polarization axes of the linearly polarized light LOUT can be distributed.

Note that the polarization axis rotation element 100 may be an optical film. Such an optical film can be made from a liquid crystal polymer or the like in a predetermined alignment state. The polarization axis rotation element 100 may as well be provided with an electrode which is controlled to apply a voltage to the liquid crystal layer LC.

Second Embodiment

Figure 7:
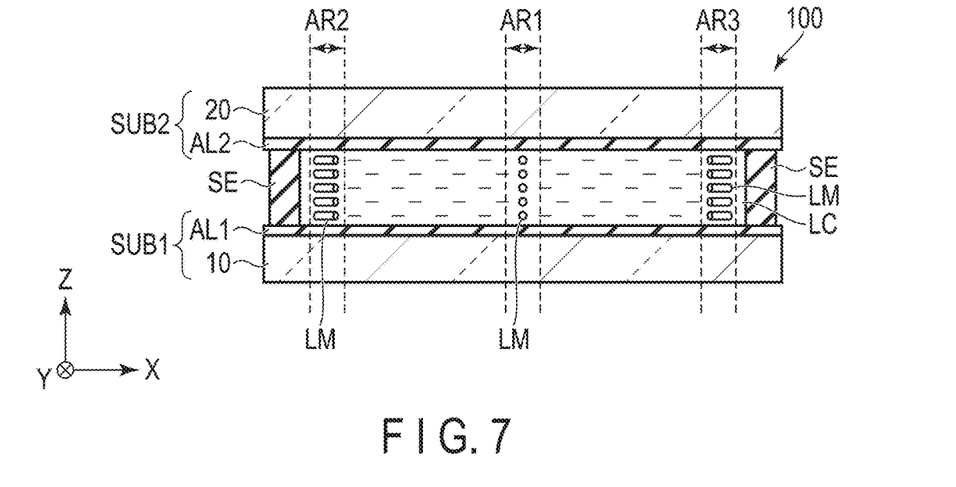
FIG. 7 is a cross-sectional view showing another configuration example of the polarization axis rotation element shown in FIG. 1.

FIG. 7 is a cross-sectional view showing another configuration of the polarization axis rotation element 100 shown in FIG. 1. The configuration shown in FIG. 7 is different from that of FIG. 2 in the alignment state of the liquid crystal molecules LM in the liquid crystal layer LC.

In the first area AR1, the liquid crystal molecules LM arranged along the third direction Z have their longitudinal axes aligned in the same direction. In the second area AR2, the longitudinal axes of the liquid crystal molecules LM arranged along the third direction Z are aligned in the same direction. In the third direction Z, the longitudinal axes of the liquid crystal molecules LM arranged along the third direction Z are aligned in the same direction. The polarization axis rotation element 100 of the second embodiment is configured to impart a phase difference of ½ wavelength to the transmitted polarization component. At this time, when the birefringence index of the liquid crystal molecules LM is represented by $\Delta n$, the thickness of the liquid crystal layer LC is d, and the wavelength of the light incident on the polarization axis rotation element 100 is $\lambda$, the relationship $\Delta n \cdot d = \lambda/2$ is satisfied.

Figure 8:
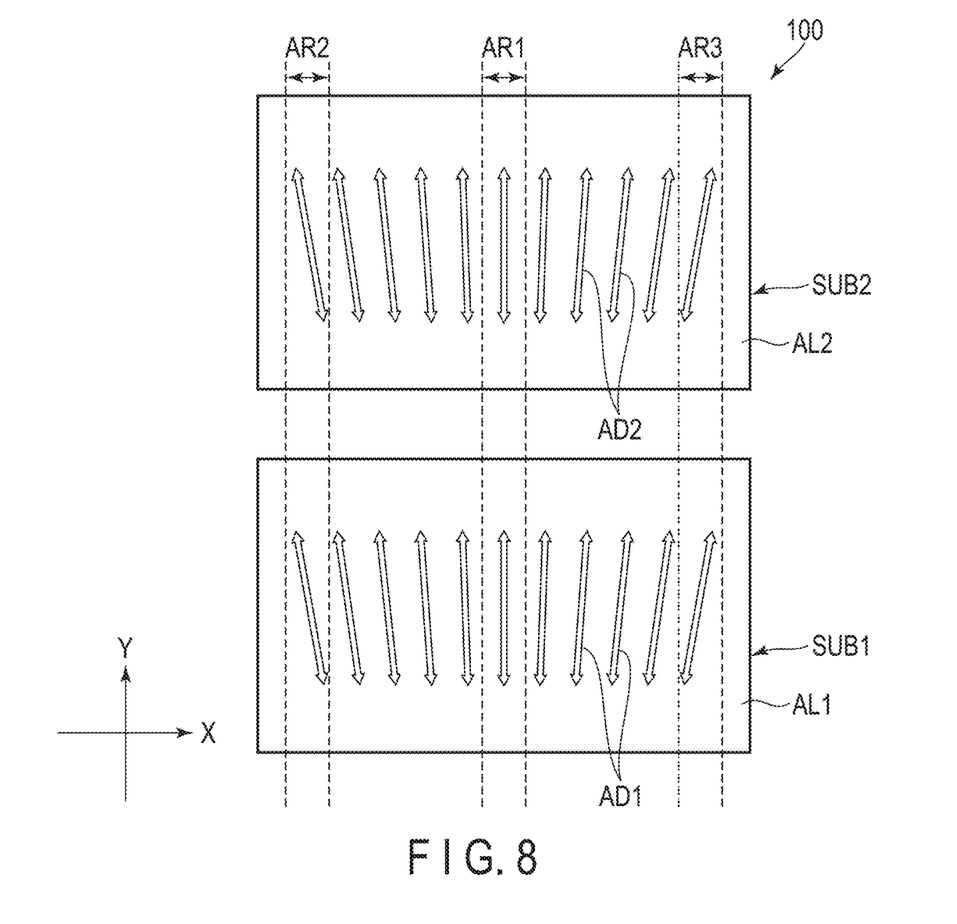
FIG. 8 is a diagram showing an alignment treatment direction of a first alignment film and an alignment treatment direction of a second alignment film of the polarization axis rotation element shown in FIG. 7.

FIG. 8 is a diagram illustrating the alignment treatment direction AD1 of the first alignment film AL1 and the alignment treatment direction AD2 of the second alignment film AL2 of the polarization axis rotation element 100 shown in FIG. 7.

The alignment treatment direction AD1 is parallel to the alignment treatment direction AD2. The alignment treatment direction AD1 varies depending on the position. Similarly, the alignment treatment direction AD2 varies depending on the position. For example, in the example illustrated, the alignment treatment direction AD1 is inclined further gradually counterclockwise as the location is further left from the first area AR1, and is inclined further gradually clockwise as the location is further right from the first area AR1. Similarly, the alignment treatment direction AD2 is inclined further gradually counterclockwise as the location is further left from the first area AR1, and is inclined further gradually clockwise as the location is further right from the first area AR1.

Figure 9:
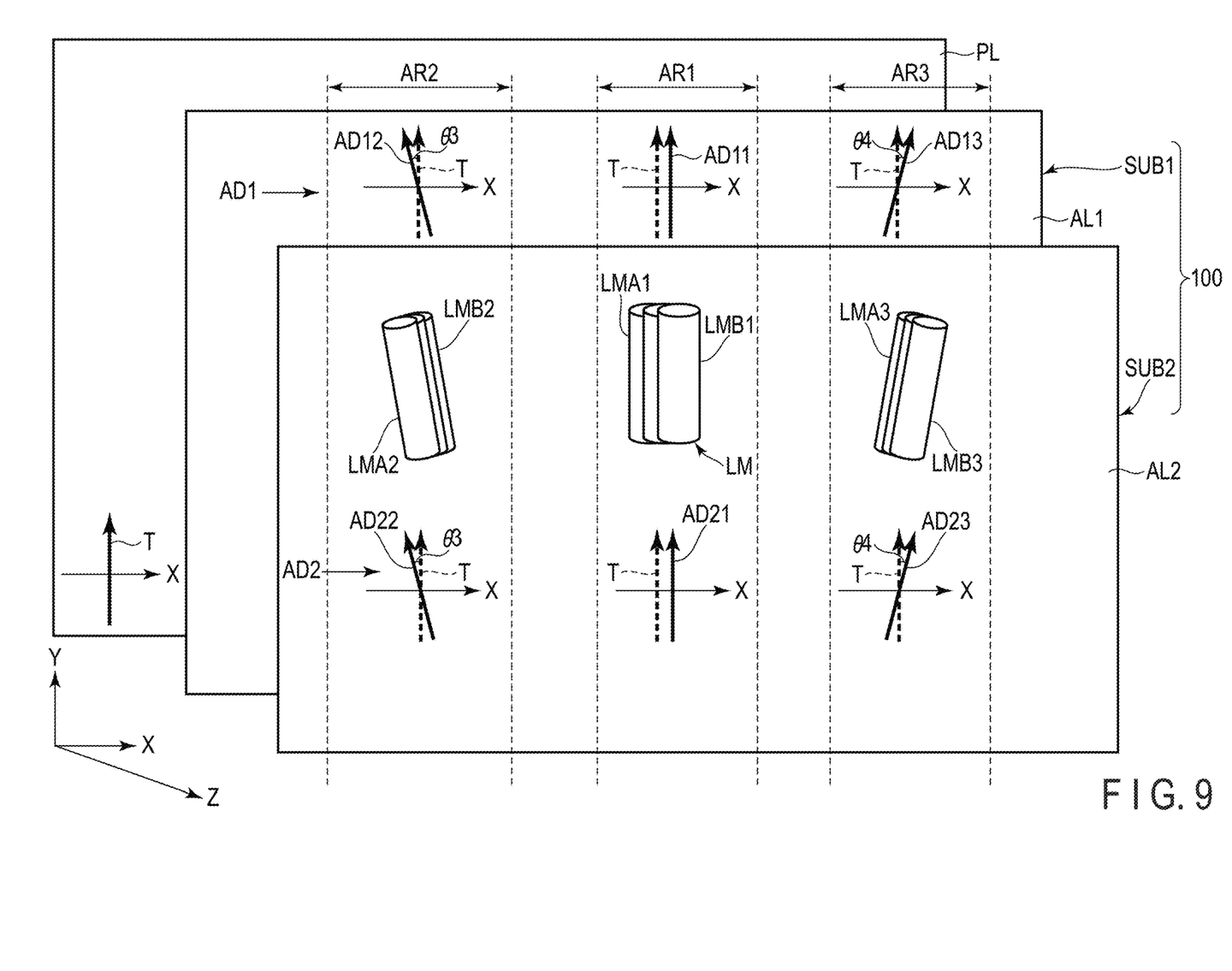
FIG. 9 is a diagram illustrating a relationship between the polarizer and the polarization axis rotation element.

FIG. 9 illustrates the relationship between the polarizer PL and the polarization axis rotation element 100.

In the first alignment film AL1, the alignment treatment direction AD11 of the first area AR1, the alignment treatment direction AD12 of the second area AR2 and the alignment treatment direction AD13 of the third area AR3 are different from each other. The alignment treatment direction AD11 is substantially parallel to the transmission axis T. In other words, the alignment treatment direction AD11 is located at an orientation of 90° with respect to the X axis. In the first alignment film AL1, the alignment treatment direction AD12 of the second area AR2 is inclined at a third angle θ3 counterclockwise with respect to the alignment treatment direction AD11 of the first area AR1. In other words, the alignment treatment direction AD12 is located at an orientation of 90°+θ3 with respect to the X-axis. In the first alignment film AL1, the alignment treatment direction AD13 of the third area AR3 is inclined at a fourth angle θ4 clockwise with respect to the alignment treatment direction AD11 of the first area AR1. In other words, the alignment treatment direction AD13 is located at an orientation of 90°−θ4 with respect to the X-axis.

In the second alignment film AL2, the alignment treatment direction AD21 of the first area AR1, the alignment treatment direction AD22 of the second area AR2 and the alignment treatment direction AD23 of the third area AR3 are different from each other. The alignment treatment direction AD21 is substantially parallel to the transmission axis T. In other words, the alignment treatment direction AD21 is located at an orientation of 90° with respect to the X axis. In the second alignment film AL2, the alignment treatment direction AD22 of the second area AR2 is inclined at a third angle θ3 counterclockwise with respect to the alignment treatment direction AD21 of the first area AR1. In other words, the alignment treatment direction AD22 is located at an orientation of 90°+θ3 with respect to the X-axis. In the second alignment film AL2, the alignment treatment direction AD23 of the third area AR3 is inclined at a fourth angle θ4 clockwise with respect to the alignment treatment direction AD23 of the first area AR1. In other words, the alignment treatment direction AD23 is located at an orientation of 90°−θ4 with respect to the X-axis. For example, the magnitude of the third angle θ3 and the fourth angle θ4 are equal to each other.

In the first area AR1, the alignment treatment direction AD11 of the first alignment film AL1 and the alignment treatment direction AD21 of the second alignment film AL2 are substantially parallel to each other. In the second area AR2, the alignment treatment direction AD12 of the first alignment film AL1 and the alignment treatment direction AD22 of the second alignment film AL2 are substantially parallel to each other. In the third area AR3, the alignment treatment direction AD13 of the first alignment film AL1 and the alignment treatment direction AD23 of the second alignment film AL2 are substantially parallel to each other.

In the first area AR1, liquid crystal molecules LMA1 on a side close to the first substrate SUB1 are aligned such that their longitudinal axes are along the alignment treatment direction AD11. Or, these liquid crystal molecules LMA1 are aligned along the transmission axis T. In other words, the liquid crystal molecules LMA1 are aligned at an orientation of 90° with respect to the X axis. Liquid crystal molecules LMB1 are aligned such that their longitudinal axes are along the alignment treatment direction AD21. In other words, the liquid crystal molecules LMB1 are aligned at an orientation of 90° with respect to the X axis. In the first area AR1, the liquid crystal molecules LM arranged along the third direction Z are aligned such that their longitudinal axes are parallel to the alignment treatment directions AD11 and AD21.

In the second area AR2, liquid crystal molecules LMA2 on a side close to the first substrate SUB1 are aligned such that their longitudinal axes are along the alignment treatment direction AD12. In other words, these liquid crystal molecules LMA2 are aligned at an orientation of 90°+θ3 with respect to the x-axis. Liquid crystal molecules LMB2 on a side close to the second substrate SUB2 are aligned such that their longitudinal axes are along the alignment treatment direction AD22. In other words, these liquid crystal molecules LMB2 are aligned at an orientation of 90°+θ3 with respect to the x-axis. In the second area AR2, these liquid crystal molecules LM arranged along the third direction Z are aligned such that their longitudinal axes are parallel to the alignment treatment directions AD12 and AD22.

In the third area AR3, liquid crystal molecules LMA3 on a side close to the first substrate SUB1 are aligned such that their longitudinal axes are along the alignment treatment direction AD13. In other words, these liquid crystal molecules LMA3 are aligned at an orientation of 90°−θ4 with respect to the X-axis. Liquid crystal molecules LMB3 on a side close to the second substrate SUB2 are aligned such that their longitudinal axes are along the alignment direction AD23. In other words, these liquid crystal molecules LMB3 are aligned at an orientation of 90°−θ4 with respect to the X-axis. In the third area AR3, these liquid crystal molecules LM arranged along the third direction Z are aligned such that their longitudinal axes are parallel to the alignment treatment directions AD13 and AD23.

The alignment treatment direction AD1 of the first alignment film AL1 is at an angle of between −5° and 5° with respect to the transmission axis T of the polarizer PL. Let us suppose, for example, that in the first alignment film AL1, the alignment treatment direction AD12 is the alignment treatment direction inclined most counterclockwise with respect to the transmission axis T. In other words, assume that 90°+θ3 is the maximum inclination angle. In this case, the third angle θ3 is 5° or less. Let us further suppose, for example, that in the first alignment film AL1, the alignment treatment direction AD13 is the alignment treatment direction inclined the most clockwise with respect to the transmission axis T. In other words, assume that 90°−θ4 is the minimum inclination angle. In that case, the fourth angle θ4 is 5° or less. That is, the difference between the maximum inclination angle, 90°+θ3 and the minimum inclination angle, 90°−θ4, θ3+θ4, is 10° or less. Here, since the alignment treatment directions AD1 and AD2 are parallel to each other, this is also the case for the second alignment film AL2. In other words, the alignment treatment direction AD2 of the second alignment film AL2 is at an angle of −5 to 5° with respect to the transmission axis T of the polarizer PL.

Figure 10:
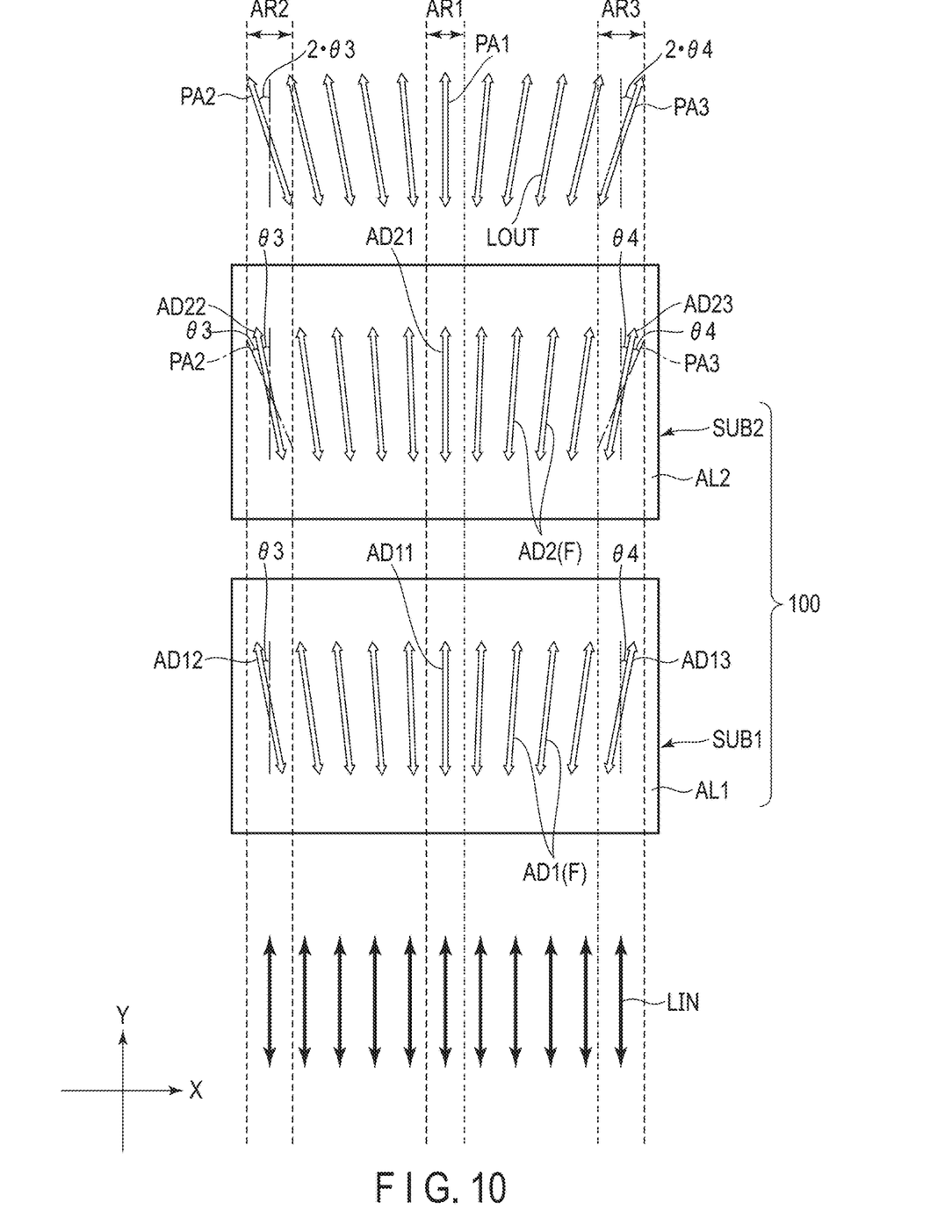
FIG. 10 is a diagram showing the polarization axis of linearly polarized light incident on the polarization axis rotation element and the polarization axis of linearly polarized light transmitted through the polarization axis rotation element.

FIG. 10 is a diagram illustrating the polarization axis of the linearly polarized light LIN incident on the polarization axis rotation element 100 and the polarization axis of the linearly polarized light LOUT transmitted through the polarization axis rotation element 100.

The polarization axis of the linearly polarized light LIN incident on the polarization axis rotation element 100 is parallel to the second direction Y. The orientation of the first polarization axis PA1 of the first polarization component transmitted through the first area AR1, the orientation of the second polarization axis PA2 of the second polarization component transmitted through the second area AR2 and the orientation of the third polarization component PA3 transmitted through the third area AR3 are different from each other. The first polarization axis PA1 is parallel to the alignment treatment direction AD21. The first polarization axis PA1 is located at an orientation of 90° with respect to the X axis.

The second polarization axis PA2 is inclined at a third angle θ3 counter-clockwise with respect to the alignment treatment direction AD22. That is, the second polarization axis PA2 is located at an orientation of 90°+2·θ3. In other words, in the second area AR2, the alignment treatment direction AD22 is located in an intermediate orientation between the orientation of the second polarization axis PA2 and the orientation of the first polarization axis PA1.

The third polarization axis PA3 is inclined at a fourth angle θ4 clockwise with respect to the alignment treatment direction AD23. That is, the third polarization axis PA3 is located at an orientation of 90°−2·θ4 with respect to the X axis. In other words, in the third area AR3, the alignment treatment direction AD23 is located an intermediate orientation between the orientation of the third polarization axis PA3 and the orientation of the first polarization axis PA1

Thus, according to the second embodiment, the orientation of the polarization axis of the linearly polarized light LOUT can be distributed.

A fast axis F (the alignment treatment directions AD1 and AD2) of the polarization axis rotation element 100 is located, in the X-Y plane, in an intermediate orientation between the orientation of the linearly polarized light LIN and the orientation of the linearly polarized light LOUT. The polarization axis rotation element 100 of the second embodiment is equivalent to a ½ wavelength plate as described above. Therefore, when the polarization axis of the incident light is located at an orientation of e° with respect to the fast axis, the polarization axis rotation element 100 has a function of rotating the polarization axis by 2*θ°.

Note that, for example, by arranging ½ wave plates in a strip-like configuration so that the orientation of the fast axis F matches that of the above-described polarization axis rotation element 100, it is possible to obtain a polarization axis rotation element having functions similar to those of the polarization axis rotation element 100 presented in the second embodiment.

As explained above, according to the embodiments, it is possible to obtain a display device and a polarization axis rotation element, which enable observers to visually recognize displayed images well even when the observers are wearing polarized sunglasses.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a display panel which displays images;
a polarization axis rotation element located between the display panel and an observer; and
a polarizer located between the display panel and the polarization axis rotation element, wherein
the polarization axis rotation element includes a first area and a second area different from the first area, and a third area on an opposite side to the second area with respect to the first area,
an orientation of a first polarization axis of a first polarization component transmitted through the first area is different from an orientation of a second polarization axis of a second polarization component transmitted through the second area,
the polarization axis rotation element comprises a first substrate including a first insulating base and a first alignment film disposed on the first insulating base, a second substrate including a second insulating base and a second alignment film disposed on the second insulating base and a liquid crystal layer located between the first substrate and the second substrate,
in the first alignment film, an alignment treatment direction of the first area, an alignment treatment direction of the second area, and an alignment treatment direction of the third area are parallel to each other, and
in the second alignment film, the alignment treatment direction of the second area is inclined at a first angle counter-clockwise with respect to the alignment treatment direction of the first area, and the alignment treatment direction of the third area is inclined at a second angle clockwise with respect to the alignment treatment direction of the first area.

2. The display device of claim 1, wherein
in the first area, the alignment treatment direction of the first alignment film and the alignment treatment direction of the second alignment film are parallel to each other, and
in the second area, the alignment treatment direction of the first alignment film and the alignment treatment direction of the second alignment film are different from each other.

3. The display device of claim 1, wherein
the alignment treatment directions of the first area and the second area of the first alignment film are parallel or orthogonal to a transmission axis of the polarizer.

4. The display device of claim 1, wherein
the alignment treatment direction of the second alignment film is at an angle of −10 to 10° with respect to a transmission axis of the polarizer.

5. A display device comprising:
a display panel which displays images;
a polarization axis rotation element located between the display panel and an observer; and
a polarizer located between the display panel and the polarization axis rotation element, wherein
the polarization axis rotation element includes a first area, a second area different from the first area, and a third area on an opposite side to the second area with respect to the first area,
an orientation of a first polarization axis of a first polarization component transmitted through the first area is different from an orientation of a second polarization axis of a second polarization component transmitted through the second area,
the polarization axis rotation element imparts a half-wavelength phase difference to a polarization component transmitted through the polarization axis rotation element,
the polarization axis rotation element comprises; a first substrate including a first insulating base and a first alignment film disposed on an inner surface of the first insulating base and having a horizontal alignment property;
a second substrate including a second insulating base and a second alignment film disposed on an inner surface of the second insulating base and having a horizontal alignment property; and
a liquid crystal layer located between the first substrate and the second substrate,
in the first alignment film, an alignment treatment direction of the second area is inclined at a third angle counter-clockwise with respect to an alignment treatment direction of the first area, and an alignment treatment direction of the third area is inclined at a fourth angle clockwise with respect to the alignment treatment direction of the first area, and
in the second alignment film, the alignment treatment direction of the second area is inclined at the third angle counter-clockwise with respect to the alignment treatment direction of the first area, and the alignment treatment direction of the third area is inclined at the fourth angle clockwise with respect to the alignment treatment direction of the first area.

6. The display device of claim 5, wherein
in the first area, the alignment treatment direction of the first alignment film and the alignment treatment direction of the second alignment film are parallel to each other, and
in the second area, the alignment treatment direction of the first alignment film and the alignment treatment direction of the second alignment film are parallel to each other.

7. The display device of claim 5, wherein
the alignment treatment direction of the second alignment film in the first area is parallel to the first polarization axis, and
the alignment treatment direction of the second alignment film in the second area is located in an intermediate orientation between an orientation of the second polarization axis and an orientation of the first polarization axis.

8. The display device of claim 5, wherein
the alignment treatment direction of the first alignment film and the alignment treatment direction of the second alignment film are at an angle of −5 to 5° with respect to the transmission axis of the polarizer.

\* \* \* \* \*